July 9, 1935.  R. B. DAY  2,007,825
VENTED RUBBER ARTICLE
Original Filed Sept. 4, 1931   3 Sheets-Sheet 2

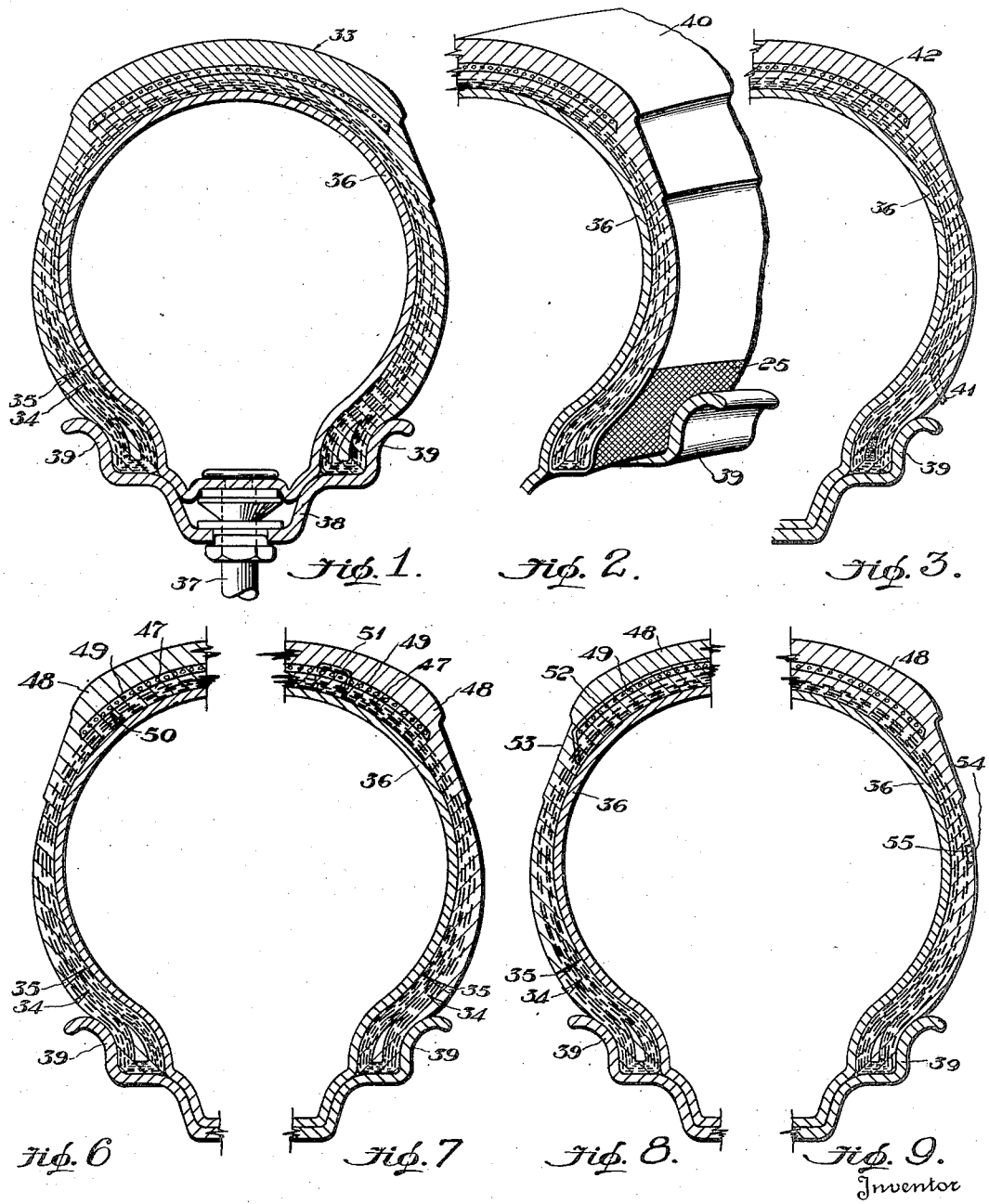

Inventor
Ralph B Day

By
Attorney

July 9, 1935.   R. B. DAY   2,007,825
VENTED RUBBER ARTICLE
Original Filed Sept. 4, 1931   3 Sheets-Sheet 3

Inventor
Ralph B. Day
By
Attorney

Patented July 9, 1935

2,007,825

UNITED STATES PATENT OFFICE 2,007,825

VENTED RUBBER ARTICLE

Ralph B. Day, Akron, Ohio, assignor, by mesne assignments, to Wingfoot Corporation, Wilmington, Del., a corporation of Delaware Original application September 4, 1931, Serial No. 561,122. Divided and this application August 31, 1932, Serial No. 631,202

3 Claims. (Cl. 152—13)

This invention relates to improvements in rubber articles and more particularly to pneumatic tires wherein fluid pressure is utilized to expand the tires while in use on vehicles. This application is a division of my application Serial No. 561,122, filed September 4, 1931, and is directed in part to the article produced by the method and apparatus disclosed in the above mentioned application and in application Serial No. 510,101, filed January 21, 1931.

Heretofore it has been customary in building pneumatic tires to provide a tire which, when mounted on a rim and inflated, is practically impervious to gases and which will not permit the escape of any fluid contained therein. Likewise, it has been customary to provide an impervious rim for this impervious tire. The inflation of this impervious tire is usually accomplished by means of a separate inflatable inner tube disposed therein or by means of an inner tube permanently secured or formed integrally with the inner wall of the tire in a structure known as a single tube tire.

In using this impervious tire and rim on a vehicle, numerous obstacles have been encountered. For example, there is a natural seepage of the inflating fluid through the inner tube and into the carcass of the tire, and the latter being impervious does not permit the escape of this seeping fluid. The impervious rim also prevents escape of this fluid and as a consequence, the fluid permeates the cords of the carcass and tends to flow along and through these cords, but as the fluid cannot escape through the relatively thick rubber sidewalls or tread portion of the tire, it forms blisters in the rubber of the sidewalls and tread and frequently causes blow-outs at these points. Likewise, tubes occasionally have small holes, such as pin holes therein, through which the fluid passes into the carcass and similar troubles occur.

I have discovered that, if some means is provided to permit the escape to the atmosphere of fluids contained within or entering into the carcass of the tire, or to permit the escape of fluids from the structure after they have seeped or leaked through the tube and before they enter the carcass, many, if not all, of the troubles incident to the action of such fluids will be overcome, and tires provided with such means are herein referred to as "vented" tires. There are many ways of venting a tire, such as by exposing the cords or fibrous material of the carcass directly to the atmosphere, or by interposing additional pervious media between the carcass and the atmosphere, thereby indirectly venting the tire. A few of the many ways are herein described.

It will be apparent that a vented tire easily may be obtained by first vulcanizing the tire in the usual manner and subsequently venting the same, but I have discovered a novel method of and apparatus for vulcanizing pneumatic tires whereby a tire, when taken from the vulcanizing mold, already is provided with venting means, thus eliminating any subsequent necessity for venting the tire. This method and apparatus are fully disclosed in said applications Serial Numbers 561,122 and 510,101, filed September 4, 1931 and January 21, 1931, respectively.

It is an object of this invention to provide a pneumatic tire in which the sidewalls and tread portion will not be subject to blister formations or blow-outs from the fluid within the tire.

Another object is to provide a pneumatic tire which is not impervious to fluid contained within the tire, and which has leaked or seeped through the tube.

A further object is to provide a pneumatic tire structure provided with novel means for venting the tire.

Other objects and advantages will become apparent from the following description.

In the drawings, I have shown several embodiments of the invention; in this showing, Fig. 1 is a cross section of a tire illustrating a vulcanized vented tire mounted on a rim;

Fig. 2 is a fragmentary perspective view embodying a modified form of vented tire;

Fig. 3 is a cross section of half a tire showing a modified form of vented tire;

Figs. 6, 7, 8 and 9 are cross sections of half a tire, each showing a modified form of vented tire;

Figure 4:
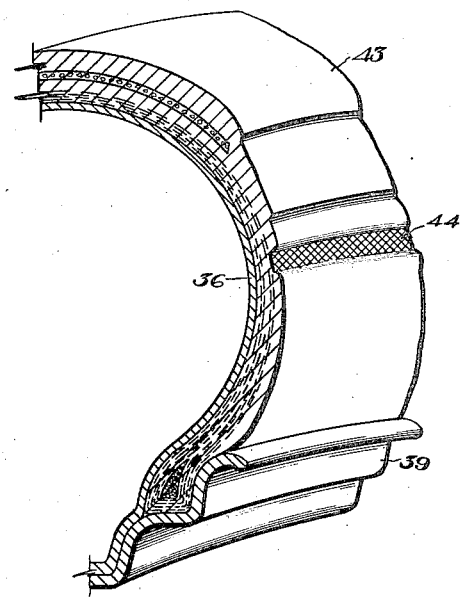
Figs. 4 and 5 are fragmentary perspective views each embodying a modified form of vented tire.

Referring now to Fig. 1 of the drawings, the numeral 33 indicates a tire as a whole of the usual construction, preferably vulcanized by the method and apparatus described in my aforesaid applications, wherein tubular needles or the like extend from the cords of the tire to permit bleeding of the tire during vulcanization. The numeral 34 indicates one or more of the openings left in the tire after the needles have been removed therefrom after vulcanization, thereby providing one or more passageways between the cords of the tire and the atmosphere to vent fluids from the carcass. If desired, additional openings such as indicated at 35, also may be provided in the tire extending substantially through the sidewalls thereof, but the provision of these latter openings is not essential.

The tire 33 is provided with an inflated inner tube 36 which may be separable therefrom or which may be formed as an integral part thereof. A conventional valve 37 is carried by the inner tube and is secured in proper position in a rim 38 provided with the usual bead retaining flanges 39, whereby the tire may be mounted in the rim in the usual manner.

The tire disclosed in Fig. 1 is a vented tire as long as the openings 34, and 35 if used, are above the flanges 39 whereby fluids, which seep through the tube 36 or which may leak therethrough from pin holes or the like, may pass along the cords of the carcass and out of the tire through the vent openings. In this manner, it will be apparent that the formation of blisters in the sidewall or tread and consequent blow-outs are prevented because the fluid is not permitted to remain in the carcass.

In connection with the venting of tires, it will be obvious that a vented tire of the type disclosed in Fig. 1 need not be produced in accordance with the method and apparatus disclosed in my aforesaid applications, but a tire produced in any manner, may have one or more openings similar to the openings 34 and 35 punched therein by means of a small awl or drill and as long as the openings are above the flanges 39, such a tire will be a vented tire, within the scope of this invention. Moreover, it will be apparent that, if a rim of the type illustrated in the copending application of B. Darrow, Serial No. 571,728 is used, the tire need not be vented above the flange, but may be vented at any point which will permit communication with one or more of the openings in said rim.

In Fig. 2, I have illustrated a tire 40 of substantially standard construction, preferably vulcanized in accordance with the method and apparatus illustrated in my aforesaid applications in the embodiment thereof, in which the bleeding of the tire during vulcanization is accomplished by means of a pervious chafer strip 25. This chafer strip is allowed to remain in place after the tire is vulcanized and it will be obvious that as long as the end of the strip is permitted to extend above the flange 39, the fluids heretofore contained within the carcass will be vented therefrom by passing outwardly through the strip.

It readily will be appreciated that vented tires can be obtained in numerous ways other than by the methods and apparatus disclosed in my aforesaid applications, and in Figs. 3 to 9 inclusive, I have illustrated various ways in which this can be accomplished by directly or indirectly exposing the cords of the fabric plies to the atmosphere. For example, in Fig. 3, I have illustrated means for venting the carcass without providing an opening therein which comprises embedding one or more cords 41 of fibrous permeable material in the sidewall of the tire, one end being in communication with the cords of the carcass and the other end with the atmosphere. As shown, the cord or cords 41 preferably are located adjacent and slightly above the flange 39, but it will be apparent that the cord may be located at substantially any point that will permit communication with the atmosphere. Obviously, fluid will pass out of the carcass through the cords 41.

In Fig. 4, I have shown means for venting a tire 43 which comprises forming a groove 44 in the sidewall thereof which is deep enough to expose the cords of the outer ply of fabric to the atmosphere and thus permit venting through this groove. If desired, this groove may extend entirely around the periphery of the sidewall of the tire.

Figure 5:
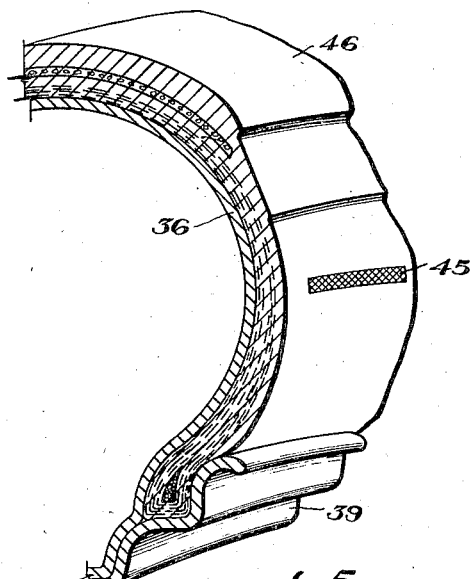

Fig. 5 illustrates a piece of permeable fabric 45 embedded in the sidewall of the tire 46, preferably directly beneath the usual number plate, which fabric engages the cords of the outer ply of the carcass whereby when the number plate is removed the outer surface of the fabric 45 will communicate with the atmosphere and fluid may pass from the cords of the carcass through the fabric 45 to the atmosphere. It will be apparent, however, that the strip of fabric 45 may be of a much greater width than shown in Fig. 5 and, if desired, may extend around the periphery of the sidewall of the tire. In fact, this fabric strip as well as the groove shown in Fig. 4, may be located any place on the tire which will permit communication with the atmosphere.

Occasionally fluid will break through the thin strip of rubber compound 47 located between the outer ply of the tire 48 and the breaker strip 49, illustrated in Fig. 6, to the breaker strip, and has difficulty in returning to the cords of the plies whereby it may be bled from the carcass. Accordingly, in such cases, I may provide an opening 50 communicating between the breaker strip and the interior of the tire and passing adjacent the cords of the fabric plies whereby such fluids may pass downwardly and out of the carcass through the openings 34 and 35, or any other suitable venting means.

The same result accomplished by the structure in Fig. 6 also may be accomplished by the structure in Fig. 7 wherein a cord 51 or the like, of fibrous, permeable material, is embedded in the carcass between the interior of the tire and the breaker strip 49, passing adjacent the cords of the fabric plies. Obviously fluids in the breaker strip will be conducted to the cords of the plies and pass out of the tire in the instance through the openings 34 and 35.

Likewise, fluid may be conducted from the breaker strip 49 by means of one or more transversely extending cords 52 of fibrous, permeable material, which are contiguous to the cords of the breaker strip and communicate near their ends with the cords of the plies as indicated at 53 in Fig. 8. Fluids will pass along the cords 52 into the cords of the carcass and in this instance pass out through the openings 34 and 35.

In order to demonstrate that a tire can be vented without directly exposing its cords to the atmosphere, Fig. 9 illustrates one or more openings 54 extending through the sidewall or other suitable portion of the tire, but not communicating with the cords thereof. However, a thin membrane or partition 55 of rubber is left between the cords of the outer ply and the atmosphere whereby the fluid, when attempting to find an outlet, will puncture through the membrane and thus escape from the carcass.

Figure 10:
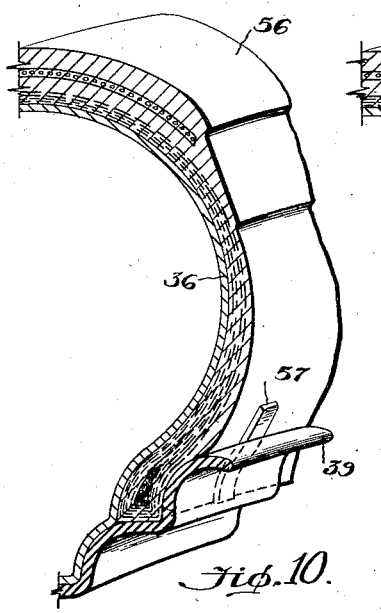
Figs. 10, 11 and 12 are fragmentary perspective views, each showing a modified form of vented tire.
Figure 11:
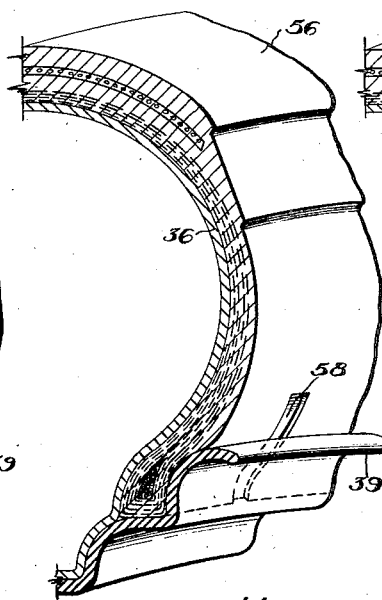
Figure 12:
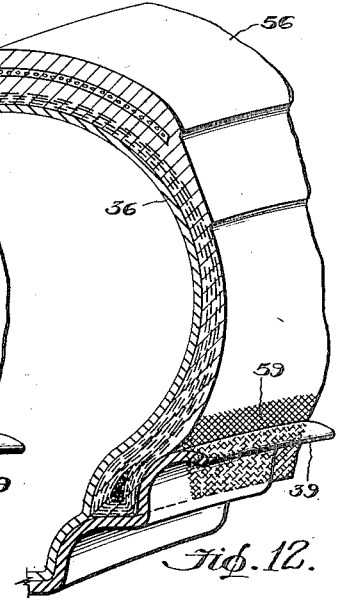

In the previous embodiments of the invention, the venting of the tire has been accomplished by exposing a portion of the cords of the carcass to the atmosphere in some suitable manner. In Figs. 10, 11 and 12, I have shown vented tires which may or may not have their cords exposed to the atmosphere and in which venting is accomplished by the passage of fluids from the interior of the tires, around the beads and over the rim flanges, or by the puncturing of the fluids through the layer of rubber surrounding the beads and over the rim flanges. Fig. 10 shows a tire 56 of the usual construction provided with one or more ridges 57 extending transversely of the beads or wholly or partially across the bottom of the beads and up the sidewall of the tire a sufficient distance to extend beyond the rim flange. In this embodiment of the invention, seeping fluids and the like will pass from the interior of the tire under the beads and/or puncture from the carcass through the thin layer of rubber surrounding the beads and along the small passages formed at the sides of the ridges 57 to the atmosphere.

As shown in Fig. 11, substantially the same result may be accomplished by providing one or more grooves 58, which also pass transversely of the beads or wholly or partially across the bottom of the beads and upwardly on the sidewall of the tire to a point above the rim flange. In this form of the invention, fluid will pass from the interior of the tire and/or of the carcass to the atmosphere along the grooves 58.

In Fig. 12, I have shown a tire provided with one or more knurled or roughened portions 59 extending in the same manner as the ridges and grooves previously described whereby a plurality of small intercommunicating passageways will be provided around the beads and sidewall to vent the tire.

Figure 13:
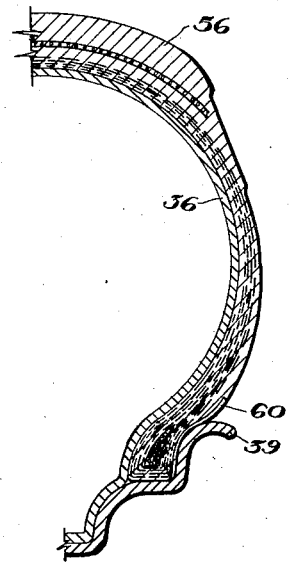
Fig. 13 is a cross section of half a tire embodying a modified form of vented tire.
Figure 14:
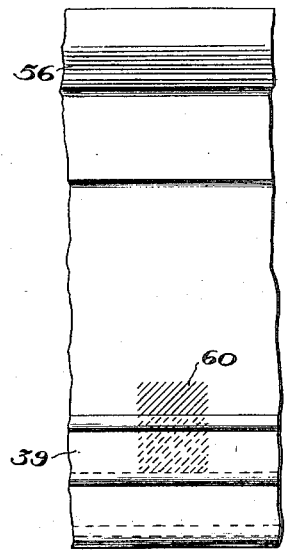
Fig. 14 is a side elevation of a portion of the tire shown in Fig. 13.

Instead of using an integral chafer on the tire, as illustrated in Fig. 2, I may secure one or more pieces of permeable fabric to the tire adjacent the beads, which fabric communicates with the cords of the tire adjacent the bead portion and extends above the rim flange whereby fluid may pass through this fabric to vent the tire, as illustrated in Figs. 13 and 14.

It is believed to be apparent that I have provided a novel pneumatic tire and means for venting tires in various ways.

Although I have illustrated a number of preferred forms of the invention and have described those forms in detail, it will be apparent to those skilled in the art that the invention is not so limited, but that various modifications may be made therein without departing from the spirit of the invention or from the scope of the appended claims.

What I claim is:

1. A vulcanized pneumatic tire including sidewalls and bead portions, a ridge arranged directly on at least one of said sidewalls and extending beneath the adjacent bead portion whereby to provide passageways on each side of said ridge between the interior of the tire and the atmosphere when the tire is mounted on a support.

2. In a vulcanized pneumatic tire including sidewalls and bead portions, one or more ridges arranged directly on at least one of said sidewalls and having its inner end extending at least partially beneath the heel of the adjacent bead portion while its outer end extends into the atmosphere, whereby to provide a passageway on each side of each of said ridges for bleeding fluids from within the tire carcass.

3. In a unit comprising an inflated tire and tube and a rim, said tire including sidewalls and bead portions and said rim including tire retaining flanges, one or more ridges arranged directly on at least one of said sidewalls, the outer end of said ridge or ridges extending beyond the adjacent rim flange and the inner end thereof extending at least to the heel of the adjacent bead, whereby to provide a passageway on each side of each of said ridges for bleeding fluids from within the tire carcass.

RALPH B. DAY.